US012370811B2

(12) United States Patent
Watanabe et al.

(10) Patent No.: US 12,370,811 B2
(45) Date of Patent: Jul. 29, 2025

(54) PRINTING APPARATUS AND CONTROL METHOD THEREOF

(71) Applicant: CANON KABUSHIKI KAISHA, Tokyo (JP)

(72) Inventors: Kazuhiro Watanabe, Tokyo (JP); Keita Takatani, Yokohama (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/505,656

(22) Filed: Nov. 9, 2023

(65) Prior Publication Data

US 2024/0083180 A1 Mar. 14, 2024

Related U.S. Application Data

(63) Continuation of application No. 17/532,508, filed on Nov. 22, 2021, now Pat. No. 11,840,104, which is a (Continued)

(30) Foreign Application Priority Data

Mar. 29, 2019 (JP) ................................ 2019-068566

(51) Int. Cl.
*B41J 2/175* (2006.01)
*B41J 3/46* (2006.01)
(Continued)

(52) U.S. Cl.
CPC ............ *B41J 3/46* (2013.01); *B41J 2/17513* (2013.01); *B41J 2/1752* (2013.01);
(Continued)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 6,064,498 A 5/2000 Taniguchi et al.
6,575,548 B1 * 6/2003 Corrigan, III ....... B41J 2/04543 347/19
(Continued)

FOREIGN PATENT DOCUMENTS

JP 08-123258 A 5/1996
JP 2002-067454 A 3/2002
(Continued)

OTHER PUBLICATIONS

Office Action dated Nov. 22, 2021, in Japanese Patent Application No. 2019-068566.

(Continued)

*Primary Examiner* — Anh T Vo
(74) *Attorney, Agent, or Firm* — Venable LLP

(57) ABSTRACT

A printing apparatus includes at least a tank configured to hold a first printing material at a first position and a tank configured to hold a second printing material at a second position different from the first position. A light emitting control unit controls light emitting states of a plurality of light emitters. If an amount of the printing material in the first tank is less than a predetermined amount, and an amount of the printing material in the second tank is greater than a predetermined amount, the light emitting control unit transits a state of a first light emitter from a state indicating that the amount of the printing material is greater than the predetermined amount to a state indicating that the amount of the printing material is less than the predetermined amount, and maintains a state of a second light emitter.

42 Claims, 7 Drawing Sheets

Related U.S. Application Data continuation of application No. 16/825,780, filed on Mar. 20, 2020, now Pat. No. 11,247,489.

(51) Int. Cl.
*B41J 29/02* (2006.01)
*B41J 29/13* (2006.01)

(52) U.S. Cl.
CPC ....... *B41J 2/17546* (2013.01); *B41J 2/17566* (2013.01); *B41J 29/02* (2013.01); *B41J 29/13* (2013.01); *B41J 2002/17569* (2013.01); *B41J 2002/17573* (2013.01)

(58) Field of Classification Search
CPC .... B41J 2/1752; B41J 2/1754; B41J 2/17546; B41J 2/17566; B41J 29/02; B41J 29/13; B41J 29/38; B41J 3/46; B41J 2002/17569; B41J 2002/17573
See application file for complete search history.

(56) References Cited

U.S. PATENT DOCUMENTS

| | | | |
|---|---|---|---|
| 6,767,075 B1 | 7/2004 | Takada et al. | |
| 7,349,131 B2 | 3/2008 | Amemiya et al. | |
| 7,841,711 B2 * | 11/2010 | Matsumoto | B41J 2/17543 347/86 |
| 8,801,162 B2 | 8/2014 | Matsumoto et al. | |
| 8,989,612 B2 | 3/2015 | Miyagawa | |
| 9,046,846 B2 * | 6/2015 | Kanzawa | G03G 15/5016 |
| 2005/0225620 A1 | 10/2005 | Nishino | |
| 2008/0001985 A1 | 1/2008 | Hatasa et al. | |
| 2008/0273047 A1 | 11/2008 | Kawarazuka et al. | |
| 2010/0309266 A1 | 12/2010 | Matsumoto et al. | |
| 2010/0328404 A1 * | 12/2010 | Sakurai | B41J 2/17566 347/86 |
| 2014/0307015 A1 | 10/2014 | Nie et al. | |

FOREIGN PATENT DOCUMENTS

| | | |
|---|---|---|
| JP | 2002-086697 A | 3/2002 |
| JP | 2003-127510 A | 5/2003 |
| JP | 2005-084460 A | 3/2005 |
| JP | 2006-246332 A | 9/2006 |
| JP | 2009-040061 A | 2/2009 |
| JP | 2013-105097 A | 5/2013 |
| JP | 2014-043085 A | 3/2014 |
| JP | 2015-182357 A | 10/2015 |
| JP | 2016-048359 A | 4/2016 |
| JP | 2016-170621 A | 9/2016 |
| JP | 2017-187906 A | 10/2017 |
| WO | 2015/174470 A1 | 11/2015 |

OTHER PUBLICATIONS

Office Action dated Mar. 4, 2022, in Japanese Patent Application No. 2019-068566.
Office Action dated Mar. 1, 2024, in Japanese Patent Application No. 2023-120176.
Panasonic Instruction Manual (Basic) Full-color Digital MFP, pp. 1, 23, 24, and 112, Jan. 31, 2006.
Office Action dated Aug. 6, 2024, in Japanese Patent Application No. 2024-057614.

* cited by examiner

PRINTING APPARATUS AND CONTROL METHOD THEREOF

BACKGROUND OF THE INVENTION

Field of the Invention

The present invention relates to a printing apparatus and a control method thereof.

Description of the Related Art

Conventionally, there exists an inkjet printing apparatus that discharges ink from a printhead and performs printing on a printing medium. In a case of such a printing apparatus, if a user is present near the printing apparatus, he/she can confirm that the printing apparatus is printing based on the driving sound of the printhead or the state of conveyance of a printing medium. Recently, however, a setting or print start instruction can be input from a portable terminal such as a smartphone. The user may be present within a range where the printing apparatus can visually be recognized but not near the printing apparatus. Japanese Patent Laid-Open No. 2002-67454 discloses a technique of making it possible to clearly visibly recognize that a printing apparatus is printing by providing a plurality of LEDs for displaying a recording state on an outer housing that covers a mechanism portion including a printhead and the like.

SUMMARY OF THE INVENTION

According to one embodiment of the present invention, a printing apparatus including at least a tank configured to hold a first printing material at a first position and a tank configured to hold a second printing material at a second position different from the first position, comprises: a light emitting control unit configured to control light emitting states of a plurality of light emitters provided on a housing of the printing apparatus, wherein if an amount of the printing material in the first tank is smaller than a predetermined amount, and an amount of the printing material in the second tank is larger than a predetermined amount, the light emitting control unit transits a state of a first light emitter arranged at a position corresponding to the first tank from a state when the amount of the printing material is larger than the predetermined amount to a state when the amount of the printing material is smaller than the predetermined amount, and maintains a state of a second light emitter arranged at a position corresponding to the second tank in a state when the amount of the printing material is larger than the predetermined amount.

According to another embodiment of the present invention, a control method of a printing apparatus including at least a tank configured to hold a first printing material at a first position and a tank configured to hold a second printing material at a second position different from the first position, comprises: controlling light emitting states of a plurality of light emitters provided on a housing of the printing apparatus, wherein if an amount of the printing material in the first tank is smaller than a predetermined amount, and an amount of the printing material in the second tank is larger than a predetermined amount, in the controlling the light emitting states, a state of a first light emitter arranged at a position corresponding to the first tank is transited from a state when the amount of the printing material is larger than the predetermined amount to a state when the amount of the printing material is smaller than the predetermined amount, and a state of a second light emitter arranged at a position corresponding to the second tank in a state when the amount of the printing material is larger than the predetermined amount is maintained.

Further features of the present invention will become apparent from the following description of exemplary embodiments (with reference to the attached drawings).

DESCRIPTION OF THE EMBODIMENTS

Figure 1:
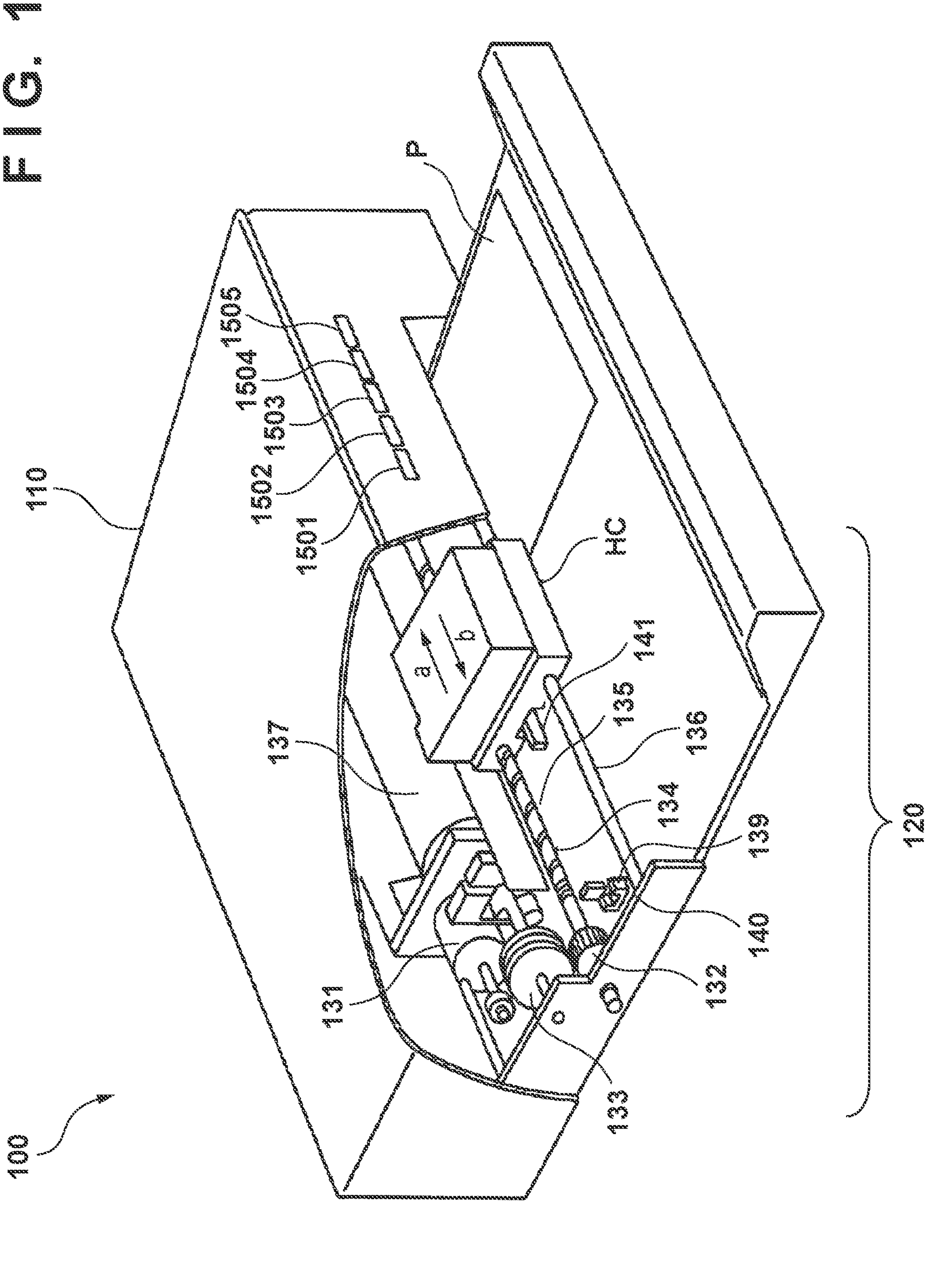
FIG. 1 is a view for explaining the schematic arrangement of a printer according to the first embodiment.

A requirement for improving convenience when confirming a state of a printing apparatus by a user is further increasing. To meet this requirement, a technique of allowing a user to recognize a state of a printing apparatus more easily than the conventional technique is demanded.

Embodiments of the present invention have been made in consideration of the above problem, and provide a technique of allowing a user to recognize a state of a printing apparatus more easily.

Hereinafter, embodiments will be described in detail with reference to the accompanying drawings. It should be noted that the following embodiments are not intended to limit the scope of the appended claims. A plurality of features are described in the embodiments. Not all the plurality of features are necessarily essential to the present invention, and the plurality of features may arbitrarily be combined. In addition, the same reference numerals denote the same or similar parts in the accompanying drawings, and a repetitive description will be omitted.

In this specification, the term “printing” is not limited to the formation of significant information such as characters and graphics. This also broadly includes the formation of images, figures, patterns, and the like on a print medium, or the processing of the medium, regardless of whether they are significant or insignificant and whether they are visualized so as to be visually perceivable by humans.

In addition, the term “print medium” not only includes a paper sheet used in common printing apparatuses, but also broadly includes conveyable media, such as cloth, plastic film, metal plates, glass, ceramics, wood, leather, and the like.

Furthermore, the term “ink” (to also be referred to as a “liquid” hereinafter) should be extensively interpreted in a similar manner to the definition of “printing (print)” described above. Ink includes a liquid which, when applied onto a print medium, can form images, figures, patterns, and the like, can process the print medium, or can process ink (for example, solidify or insolubilize a coloring material contained in ink applied to the print medium).

First Embodiment

<Schematic Arrangement of Printer>

FIG. 1 is a view for explaining the schematic arrangement of a printer 100 (inkjet printing apparatus) according to the first embodiment. The printer 100 includes a housing 110, and a mechanism portion 120 including a carriage HC is stored in the housing 110. Note that the printing method of the printer may be an electrophotographic method.

The mechanism portion 120 includes a driving motor 131, driving force transmission gears 132 and 133, a lead screw 134, the carriage HC, a guide rail 136, and a platen 137.

The driving motor 131 is a motor configured to drive the carriage HC and capable of rotating in the forward and reverse directions. When the driving motor 131 rotates, the rotation is transmitted to the lead screw 134 via the driving force transmission gears 132 and 133. When the lead screw 134 rotates, the carriage HC engaging with a helical groove 135 moves along with the rotation. When moving along with the rotation of the lead screw 134, the carriage HC reciprocally moves in the directions of arrows a and b while being supported by the guide rail 136. An integrated ink cartridge 400 (to be referred to as a cartridge 400 hereinafter) including a printhead 205 (see FIG. 2) and an ink tank 401 (see FIG. 4) is mounted on the carriage HC. Note that the ink cartridge 400 need only be an exchangeable component, and the printhead 205 and the ink tank need not be integrated.

Photocouplers 139 and 140 are home position detectors configured to confirm the existence of a lever 141 of the carriage HC in this range and switch the rotation direction of a motor 138. When the rotation of a conveyance motor (not shown) of printing paper P is transmitted to the platen 137 via a transmission gear (not shown), the printing paper P is conveyed in a direction almost orthogonal to the moving direction of the carriage HC by the rotation of the platen 137.

A light emitting unit configured to display the state of the printer 100 is provided on the front surface portion of the housing 110. In this embodiment, a light emitting unit 150 includes a plurality of light emitters 1501 to 1505 arranged in one line in the horizontal direction so as to be almost parallel to the moving direction of the printhead 205. For example, the light emitters 1501 to 1505 each include a light-emitting diode (LED). In this embodiment, each of the light emitters 1501 to 1505 includes LED chips of red (R), green (G), and blue (B), and emits light of an arbitrary color by adjusting the light amounts of the LEDs. However, a light emitter formed by an LED of a single color or another light source can also be employed.

Note that the number, arrangement, shape, and the like of the light emitters that form the light emitting unit 150 can appropriately be designed. For example, less than five or six or more light emitters may be provided. For example, the printer 100 may include light emitters in number equal to or more than the number of ink tanks attached to the printer. The light emitters may be arranged on the entire front surface of the housing 110 in the main scanning direction. Furthermore, each light emitter may have a shape long in the vertical direction.

<Hardware Arrangement>

Figure 2:
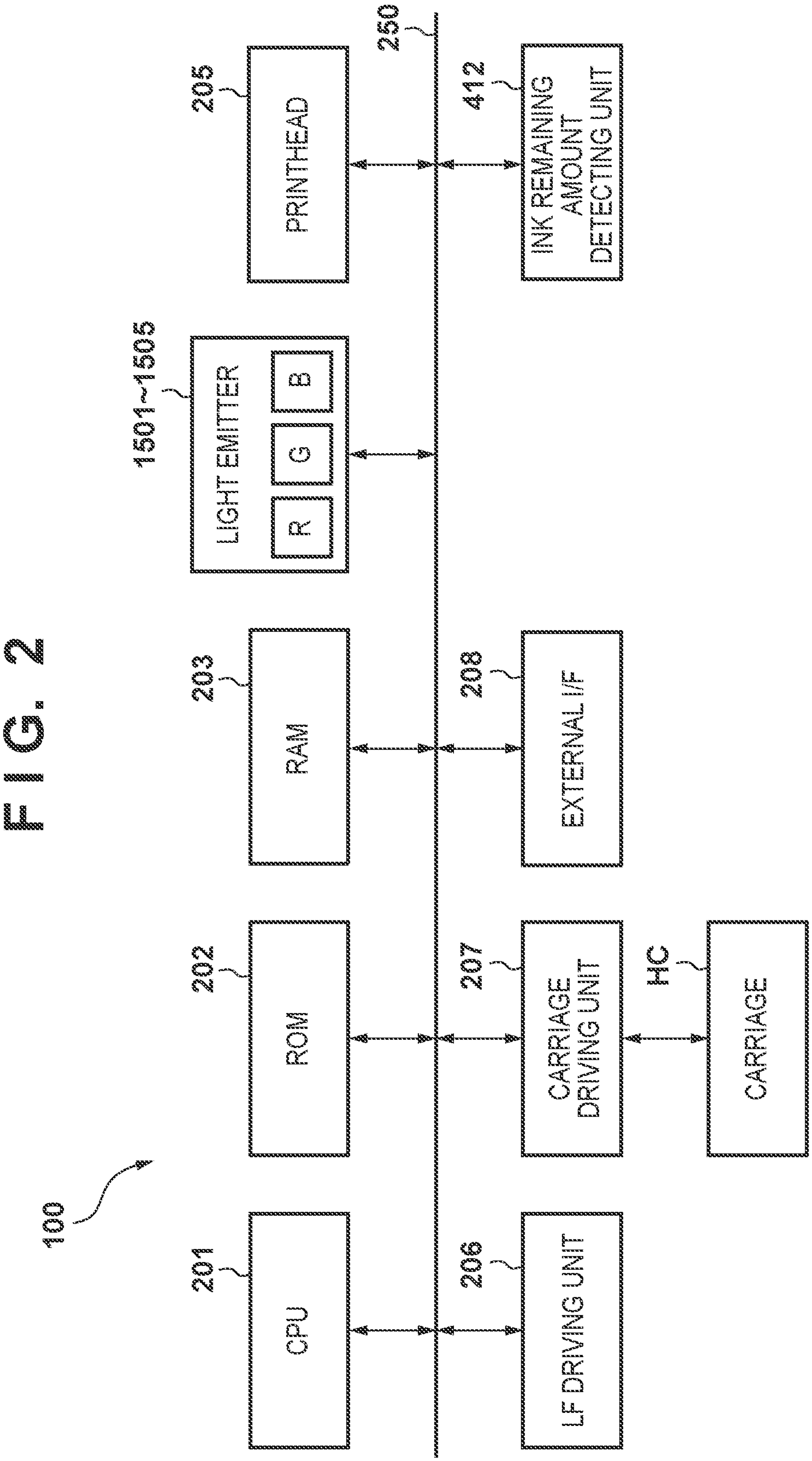
FIG. 2 is a block diagram showing an example of the hardware arrangement of the printer shown in FIG. 1.

FIG. 2 is a block diagram showing an example of the hardware arrangement of the printer 100 according to this embodiment. A CPU 201 comprehensively controls the printer 100. A ROM 202 stores a control program of the CPU 201, font data for font processing, and the like. A RAM 203 temporarily stores various kinds of data. For example, the CPU 201 loads a program stored in the ROM 202 into the RAM 203 and executes it, thereby executing operation control and data processing of the printer 100.

Each of the light emitters 1501 to 1505 includes LED chips of red (R), green (G), and blue (B). When each of the LED chips of red (R), green (G), and blue (B) emits light in a light amount according to a control signal transmitted from the CPU 201, the light emitters 1501 to 1505 emit light in various colors.

The printhead 205 discharges ink (printing material) to the sheet P as a printing medium in accordance with a control signal transmitted from the CPU 201. An LF driving unit 206 includes, for example, a sheet feed motor driver and a sheet feed motor (conveyance motor), and conveys the printing medium such as the sheet P in accordance with a control signal transmitted from the CPU 201. A carriage driving unit 207 includes, for example, a carriage motor driver, a carriage motor (driving motor 131), and a carriage position detection circuit, and moves the carriage HC in accordance with a control signal transmitted from the CPU 201. The carriage position detection circuit is configured to be able to detect the position of the carriage HC in the main scanning direction based on an output signal from, for example, a linear encoder. An external I/F 208 is connected to a PC or the like to receive print data and the like and transmit a status signal and the like. An ink remaining amount detecting unit 412 detects the remaining amount of ink 411 in the ink tank 401 (see FIG. 4).

<Software Arrangement>

Figure 7:
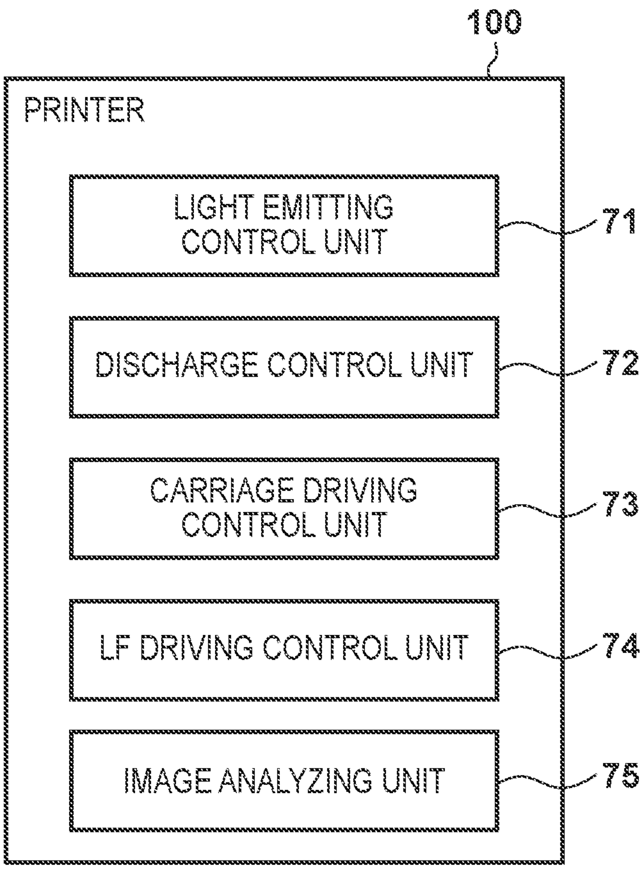
FIG. 7 is a block diagram showing an example of the software arrangement of the printer shown in FIG. 1.

FIG. 7 is a block diagram showing an example of the software arrangement of the printer 100 according to this embodiment. The CPU 201 loads a program stored in, for example, the ROM 202 into the RAM 203 and executes it, thereby functioning as each functional unit shown in FIG. 7.

A light emitting control unit 71 controls the light emitting states of the light emitters 1501 to 1505 disposed on the housing 110. For example, the light emitting control unit 71 blinks, turns on, or turns off the light emitters 1501 to 1505. Additionally, for example, the light emitting control unit 71 adjusts the light amounts of the LEDs of red (R), green (G), and blue (B) provided in each of the light emitters 1501 to 1505, thereby controlling the emission light colors of the light emitters 1501 to 1505.

A discharge control unit 72 transmits a heat pulse signal to the printhead 205 based on image data to be printed, and controls ink discharge by the printhead 205. A carriage driving control unit 73 transmits a control signal to the carriage driving unit 207, and controls the movement of the carriage HC in the main scanning direction orthogonal to the conveyance direction of the sheet P. An LF driving control unit 74 transmits a control signal to the LF driving unit 206, and controls conveyance of the sheet P. An image analyzing unit 75 analyzes a print image. For example, the image analyzing unit 75 acquires color information of a print image and analyzes it.

Note the functional units are merely examples, and the functions of functional units may be integrated, or the function of one functional unit may be divided to provide a plurality of functional units. FIG. 7 is a schematic view showing an arrangement related with this embodiment, and the printer 100 may include other functional units.

<Cartridge>

Figure 4:
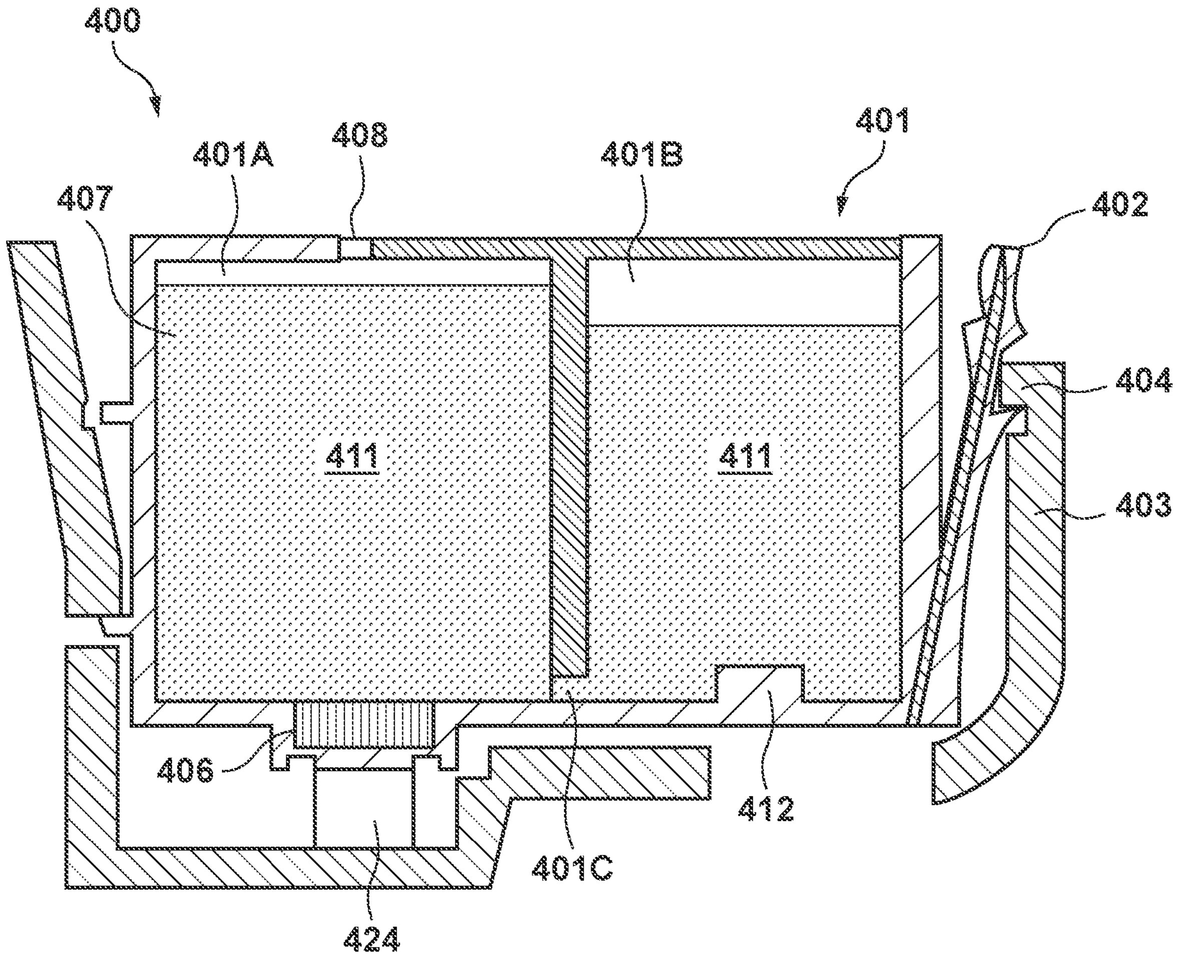
FIG. 4 is a view showing the schematic arrangement of an ink cartridge according to the first embodiment.

FIG. 4 is a sectional view showing the schematic arrangement of the cartridge 400. The cartridge 400 includes the ink tank 401 that stores ink, and a holder 403 that includes the printhead 205 and holds the ink tank 401. The ink tank 401 includes a lever 402, a locking pawl 404 provided on the lever 402 to be locked on the holder 403, an ink supply path 424, and the ink remaining amount detecting unit 412.

The ink tank 401 includes a liquid storing portion 401A that stores an absorber 407 holding the ink 411, and an ink storing portion 401B that stores the ink 411 in a liquid state. The liquid storing portion 401A and the ink storing portion 401B communicate via a passage 401C provided near the bottom surface of the ink tank 401. More specifically, as the ink in the liquid storing portion 401A is consumed by printing, gas-liquid exchange is performed via the passage 401C, and the ink in the ink storing portion 401B moves to the liquid storing portion 401A. In addition, along with the gas-liquid exchange, air is taken in via an air communicating port 408 provided in the upper portion of the ink tank 401. The ink tank 401 also includes, in the bottom surface of the liquid storing portion 401A, a supply port 406 configured to supply the ink to the printhead 205.

The ink remaining amount detecting unit 412 is provided, for example, in the bottom surface of the ink storing portion 401B, and detects the remaining amount of the ink 411 in the ink tank 401. For example, the ink remaining amount detecting unit 412 detects, by optical detection, whether the ink remaining amount is equal to or less than a predetermined amount. Note that the ink remaining amount detecting unit 412 may detect the ink remaining amount by another known method. For example, the CPU 201 may store the number of times of ink discharge in a storage medium such as a RAM provided in the main body of the printer 100 or the ink tank 401, and calculate the ink remaining amount based on the number of times of discharge.

In this embodiment, the ink remaining amount detecting unit 412 detects the ink remaining amount at a predetermined timing. For example, if the ink 411 in the ink tank 401 is consumed by ink discharge from the printhead 205, the ink remaining amount detecting unit 412 detects the ink remaining amount for each page or job.

<Processing Procedure of Light Emitting Control>

Figure 3:
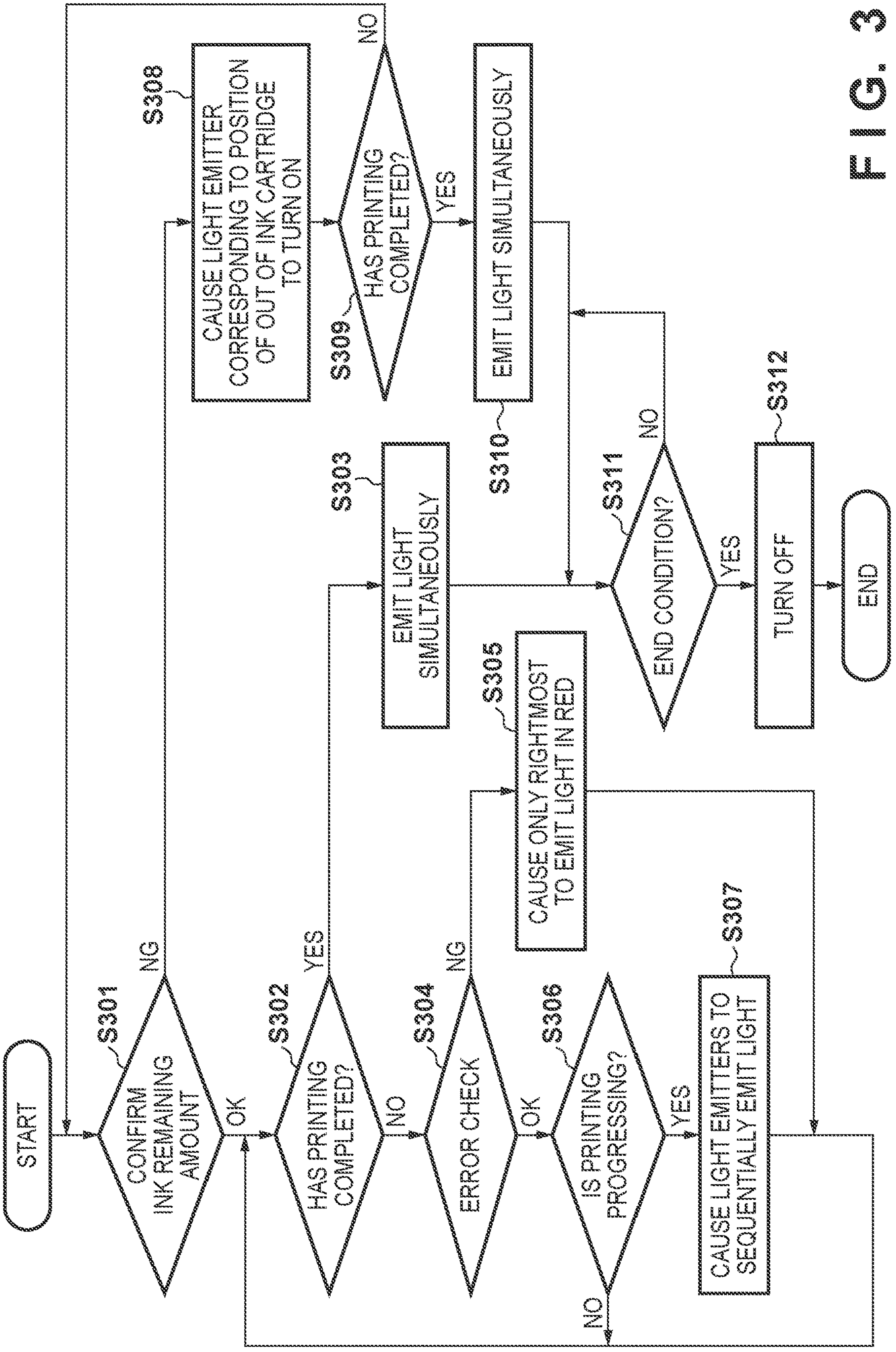
FIG. 3 is a flowchart showing an example of processing of light emitting control of the printer according to the first embodiment.

FIG. 3 is a flowchart showing the procedure of judgment/processing of the CPU 201 when causing the light emitters 1501 to 1505 disposed on the surface of the housing 110 to emit light in the printer 100 according to the first embodiment. For example, the CPU 201 loads a program stored in the ROM 202 into the RAM 203 and executes it to function as the light emitting control unit 71 shown in FIG. 7, thereby implementing this flowchart. This flowchart starts when, for example, the user turns on the power, and a print job is executed. Note that the print job is transmitted from, for example, a personal computer or a portable terminal that is an external apparatus. The print job includes, for example, print data and print setting information.

In step S301, the light emitting control unit 71 confirms, based on the detection result of the ink remaining amount detecting unit 412, whether the ink remaining amount in the ink tank of the cartridge 400 is equal to or more than a predetermined amount. If the ink remaining amount is equal to or more than the predetermined amount (OK in step S301), the light emitting control unit 71 advances to step S302. If the ink remaining amount is equal to or less than the predetermined amount (NG in step S301), the light emitting control unit 71 advances to step S308.

In step S302, the light emitting control unit 71 determines whether printing based on the print job is completed. Upon determining that printing is completed (YES in step S302), the light emitting control unit 71 advances to step S303 to cause the light emitters 1501 to 1505 to emit, for example, white light simultaneously, and advances to step S311. On the other hand, upon determining that printing based on the print job is not completed (NO in step S302), the light emitting control unit 71 advances to step S304.

In step S304, the light emitting control unit 71 confirms whether an error such as a paper jam has occurred. Upon confirming that an error has occurred (NG in step S304), the light emitting control unit 71 advances to step S305 to cause only the light emitter 1505 disposed at the rightmost position to emit light in a color (for example, red) different from the simultaneous light emission in step S303. On the other hand, upon confirming that an error has not occurred (OK in step S304), the light emitting control unit 71 advances to step S306.

In step S306, the light emitting control unit 71 determines whether printing is progressing. Upon determining that printing is progressing (YES in step S306), the light emitting control unit 71 advances to step S307 to cause the light emitters 1501 to 1505 to sequentially repetitively emit light in accordance with the sequence in the arrangement. That is, the light emitting control unit 71 continuously changes the light emitting states of the light emitters 1501 to 1505. For example, if the printing operation is being performed with the cartridge 400 arranged on the side of the light emitter 1501, the light emitting control unit 71 causes the light emitter 1501 to emit light. Next, if the cartridge 400 moves to the direction a to perform the printing operation, the light emitting control unit 71 causes the light emitter 1502 to emit light. In this way, the light emitting control unit 71 causes the light emitter corresponding to the position of the cartridge 400 to emit light. On the other hand, upon determining that printing is not progressing (NO in step S306), the light emitting control unit 71 directly returns to step S302.

If the process advances from step S301 to step S308, the light emitting control unit 71 causes a light emitter (one of the light emitters 1501 to 1505) corresponding to the position of the cartridge 400 whose ink remaining amount is equal to or less than the predetermined amount to emit light, and then advances to step S309. The light emission color at that time may be, for example, one specific color such as white, or may be a color approximate to the color of ink whose ink remaining amount is determined to be equal to or less than the predetermined amount. When a light emitter is caused to emit light in a color approximate to an ink color, the user can be notified which ink has run out from a remote position by the light emission color as well.

In step S309, the light emitting control unit 71 determines whether printing is completed. Upon determining that printing is completed (YES in step S309), the light emitting control unit 71 advances to step S310 to cause the light emitters 1501 to 1505 to emit light simultaneously, and advances to step S311. On the other hand, upon determining that printing is not completed (NO in step S309), the light emitting control unit 71 directly returns to step S301.

In step S311, the light emitting control unit 71 determines whether a predetermined end condition that, for example, the user turns off the power is satisfied. Upon determining that the end condition is satisfied (YES in step S311), the light emitting control unit 71 advances to step S312 to end the procedure. On the other hand, upon determining that the end condition is not satisfied (NO in step S311), the light emitting control unit 71 repeats the process of step S311 until it determines that the end condition is satisfied. That is, light emission of the light emitters 1501 to 1505 is continued until the end condition is satisfied.

Note that the end condition can appropriately be set. For example, it may be determined that the end condition is satisfied when a predetermined time has elapsed from the end of printing even if the power is not turned off. Alternatively, for example, a sensor capable of detecting the presence/absence of the sheet P may be provided in the discharge portion of the sheet P in the printer 100, and if extraction of the sheet P by the user is detected, it may be determined that the end condition is satisfied. As the sensor, a known structure can be employed. For example, an optical sensor or a switch that mechanically operates when contacting the sheet P can be used.

Note that light emitting control based on the ink remaining amount confirmation in step S301 may be executed before the start of printing based on the print job or after completion of printing based on the print job. For example, if printing based on the print job is completed, the light emitting control unit 71 causes the light emitters 1501 to 1505 to emit, for example, white light simultaneously and turns them off. Upon determining that the ink remaining amount is equal to or less than the predetermined amount, the light emitting control unit 71 causes only a light emitter (one of the light emitters 1501 to 1505) at a position corresponding to the position of the cartridge 400 whose ink remaining amount is equal to or less than the predetermined amount to emit light (or blink). In this case, light emitters at positions that do not correspond to the position of the cartridge 400 whose ink remaining amount is equal to or less than the predetermined amount maintain the off state.

As described above, in the printer 100 according to this embodiment, during printing, the light emitters 1501 to 1505 sequentially repetitively emit light in accordance with the sequence in the arrangement. At the end of printing, the light emitters 1501 to 1505 simultaneously emit light. This allows the user to easily recognize the state of the printer 100. In particular, since the light emitters 1501 to 1505 simultaneously emit light after printing, the user can readily discriminate between a power off state and a state in which printing is normally ended. In addition, if the ink amount is equal to or less than the predetermined amount, light emitting control for a case in which the ink amount is equal to or less than the predetermined amount is performed. Hence, the user can easily recognize the necessity of cartridge exchange. Hence, the user can easily recognize the state of the printer 100 without approaching the printer 100. Note that not the light emitting control unit 71 but another functional unit shown in FIG. 7 may perform part of the processing shown in FIG. 3.

<Light Emitting Modes of Light Emitters>

<During Printing and at End of Printing>

Figure 6A:
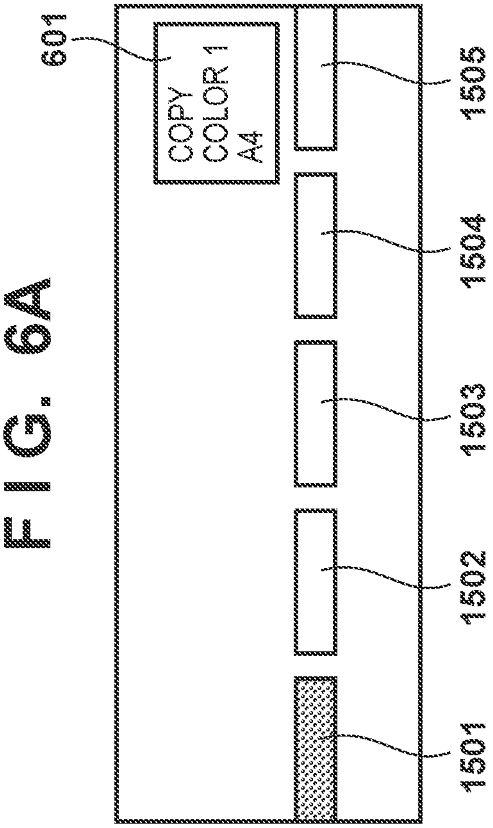
FIGS. 6A to 6D are views for explaining light emitting modes of light emitters.
Figure 6B:
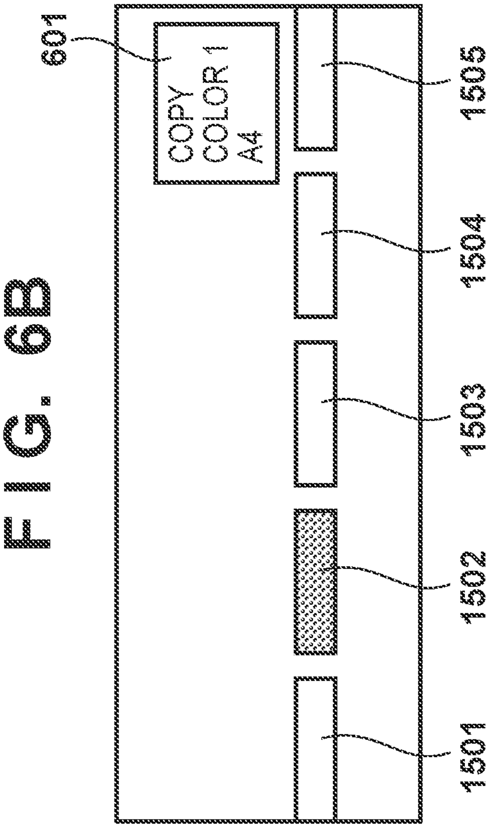
Figure 6C:
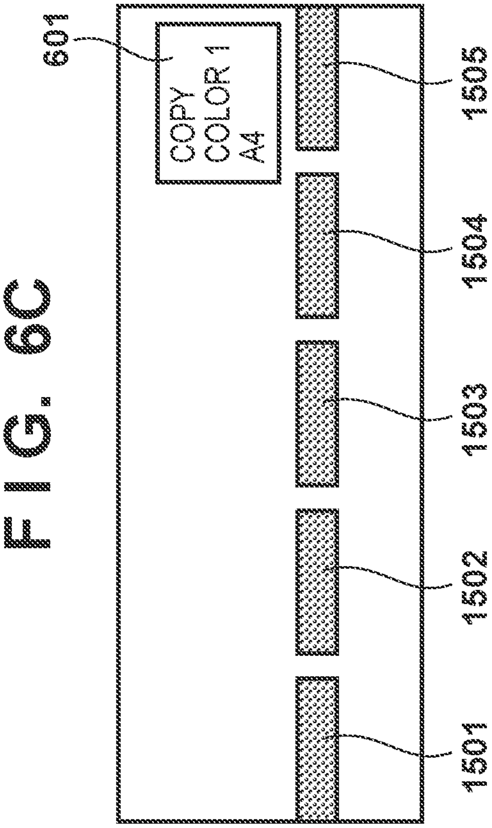

FIGS. 6A to 6D are views showing an example of the front surface of the printer 100 and views for explaining detailed light emitting modes of the light emitters 1501 to 1505. The printer 100 includes, on the front surface, the light emitters 1501 to 1505 and a liquid crystal panel 601. For example, during execution of printing, the cartridge 400 is moved by the carriage HC in the main scanning direction, and the light emitters 1501 to 1505 sequentially emit light in accordance with the movement of the cartridge 400 (step S307 in FIG. 3 and FIGS. 6A and 6B). When printing is completed, all the light emitters 1501 to 1505 are turned on (step S303 or S310 in FIG. 3 and FIG. 6C). Hence, the user can readily discriminate between a printing state, a normal end state of printing, and a power off state. During printing and at the end of printing, print setting contents (color/monochrome, paper size, single-sided/double-sided, and the like) are displayed on the liquid crystal panel 601 (FIGS. 6A to 6C).

In this embodiment, the movement of the cartridge 400 and light emission of the light emitters 1501 to 1505 are associated in the following way. That is, the light emitting control unit 71 causes a light emitter corresponding to the scanning position of the carriage HC detected by the carriage position detection circuit to emit light. In a case in which the number of light emitters is five as in this embodiment, the light emitting control unit 71 decides the light emitter to emit light based on which one of five ranges obtained by equally dividing the moving range of the carriage HC in the main scanning direction includes the center of the carriage HC. For example, if the center of the carriage HC is located in the range on the leftmost side when the printer 100 is viewed from the front side, the light emitting control unit 71 causes the light emitter 1501 to emit light. Similarly, if the center of the carriage HC is located in the Nth range from the left, the light emitting control unit 71 causes the light emitter 150N (N is 1 to 5) to emit light.

By the light emitting mode, the user can recognize that the printhead 205 is being scanned during printing. In particular, if the light emitters 1501 to 1505 emit light in various light emitting modes in accordance with the contents of a notification, the user cannot recognize the contents of the notification unless he/she learns the light emitting modes and the contents of notifications in linkage. In this embodiment, however, since the user can be made to recognize that the printhead 205 is being scanned, the user can intuitively recognize that printing is being performed.

Note that an arrangement for causing the light emitters 1501 to 1505 to sequentially emit light can also be employed. For example, not the moving range of the carriage HC but the range of the sheet P in the main scanning direction may equally be divided by the number of light emitters, and a light emitter corresponding to the scanning position of the carriage HC may emit light. Note that the light emitting control unit 71 need not decide the light emitter to emit light based on which one of five ranges obtained by equally dividing the moving range of the carriage HC in the main scanning direction includes the center of the carriage HC. In this case, the light emitting control unit 71 causes the light emitters 150N (N is 1 to 5) to sequentially emit light at a predetermined period irrespectively of the position of the carriage HC.

<At Time of Error Occurrence>

Figure 6D:
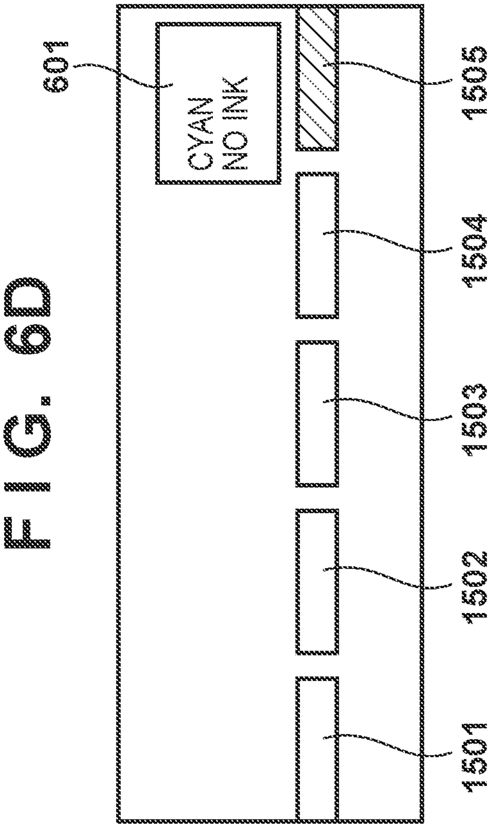

If an error has occurred during printing, the light emitting unit 150 emits light in a mode different from that during printing or at the normal end of printing to notify the user of the occurrence of the error. In this embodiment, at the time of error occurrence, the light emitter 1505 emits light in a color different from that during printing (FIG. 6D). For example, the light emitters 1501 to 1505 may emit white light during printing or at the normal end of printing, and the light emitter 1505 may emit red light at the time of error occurrence. That is, the light emitting control unit 71 transits the state of at least one of the light emitters 1501 to 1505 from a state when no error has occurred to a state when an error has occurred.

If an error such as a paper jam has occurred, the user should be notified such that the state can be clearly discriminated from both the state of normal end of printing and the power off state. In this embodiment, if an error has occurred, the light emitting mode of the light emitters is changed, thereby causing the user to recognize the state such that the state can be discriminated from the state during printing and the state of normal end of printing.

Additionally, at the time of error occurrence, error contents are displayed on the liquid crystal panel 601 (FIG. 6D). This allows the user to recognize what kind of error has occurred. Note that if an error has occurred, for example, a QR Code® corresponding to the error that has occurred may be displayed. In this case, when the user captures the QR Code® using a smartphone or the like, a web page corresponding to the error that has occurred may be displayed on the screen of the smartphone.

Note that the light emitting mode at the time of error occurrence is merely an example, and another arrangement can also be employed. For example, if the light emitters 1501 to 1505 simultaneously emit light at the end of printing, the light emitters 1501 to 1505 may simultaneously blink at the time of error occurrence. Additionally, for example, the light emission color or the light emitter to emit light may be changed in accordance with the contents of an error. For example, if an error that the user can recover, such as a paper j am, paper outage, or ink outage, has occurred, the light emitting control unit 71 turns on only the light emitter 1505 to emit red light. On the other hand, if an error such as a fault in the printer 100 has occurred, the light emitting control unit 71 causes the light emitters 1501 and 1505 to alternately emit light. This allows the user to quickly recognize what kind of error has occurred. Furthermore, for example, the light emitters 1501 to 1505 sequentially emit light during printing, but the light emitters 1501 to 1505 may emit light at random at the time of error occurrence. If the light emitters irregularly emit light, the user can intuitively recognize that an abnormality has occurred in the printer 100.

Additionally, if an error has occurred, but a printing operation can be continued, and the printing operation is ended, the printer 100 needs to simultaneously notify the user of the occurrence of the error and the end of printing. In this case, the light emitting control unit 71 may cause, for example, only the light emitter 1505 on the rightmost side to emit red light, and may cause the remaining light emitters 1501 to 1504 to emit white light. Additionally, for example, simultaneous emission of white light representing the end of printing and emission of red light only by the light emitter 1505 on the rightmost side may alternately be repeated for each predetermined time. With this arrangement, the user can simultaneously recognize the occurrence of the error and the end of printing. Note that some errors of the printer 100 occur when printing is not being performed. Hence, steps S304 and S305 may be executed when printing is not being performed. The errors that occur when printing is not being performed include, for example, disconnection of wireless connection between the printer and an access point. Another example is the absence of paper in a paper feed cassette.

<At Time of Decrease in Ink Remaining Amount>

In this embodiment, at the time of a decrease in the ink remaining amount as well, the light emitting unit 150 emits light in a mode different from that during printing or at the normal end of printing to notify the user of the occurrence. In this embodiment, the number of light emitters 1501 to 1505 corresponds to the number of attached cartridges 400. That is, five cartridges 400 are arranged in the main scanning direction and mounted on the carriage HC. Based on the arrangement of the light emitters 1501 to 1505 and the five cartridges 400, each of the light emitters 1501 to 1505 is associated with one of the five cartridges 400.

If the ink remaining amount detecting unit 412 detects that the ink remaining amount in one of the cartridges 400 is equal to or less than a predetermined amount, the light emitter arranged at a position corresponding to the position where the cartridge 400 whose ink remaining amount is equal to or less than the predetermined amount is attached emits light (step S308 in FIG. 3). For example, assume that the amount of ink in the cartridge 400 arranged on the rightmost side in the main scanning direction viewed from the front side of the printer 100 is equal to or less than a predetermined amount. In this case, the light emitting control unit 71 transits the state of the light emitter 1505 arranged on the rightmost side from a state when the ink amount is larger than the predetermined amount to a state when the ink amount is equal to or less than the predetermined amount. For example, the light emitting control unit 71 may transit the state of the light emitter 1505 from an off state to a light emitting state, or may transit the state from an on state to a blinking state. On the other hand, if the amounts of inks in the remaining cartridges 400 are larger than the predetermined amount, the light emitting control unit 71 maintains the state when the ink amount is larger than the predetermined amount as the states of the remaining light emitters 1501 to 1504.

If light is emitted in this way, the user at a remote position can be caused to recognize in which the cartridge 400 the ink remaining amount has decreased. Additionally, for example, at the time of light emission, the light emitters 1501 to 1505 may emit light in a color of the same system as the color of the ink in the cartridge 400 in which the ink remaining amount has decreased. This allows the user to recognize, from a remote position, which color the ink of the decreased remaining amount has. Furthermore, for example, if printing is completed in a state in which the ink remaining amount in the cartridge 400 has decreased, all the light emitters 1501 to 1505 emit light. However, only the light emitter corresponding to the cartridge 400 in which the ink remaining amount has decreased may emit light in a different color. This allows the user to recognize, from a remote position, that printing has ended and that the ink remaining amount has decreased.

The light emitters may emit light by another method. For example, if the ink remaining amount detecting unit 412 detects that the ink remaining amount in one of the cartridges 400 is equal to or less than a predetermined amount, the light emitting control unit 71 causes the light emitter arranged at a position corresponding to the position where the cartridge 400 whose ink remaining amount is equal to or less than the predetermined amount is attached to blink. Note that in this case, the light emitting control unit 71 turns on light emitters arranged at positions corresponding to the positions where the cartridges 400 in which the ink remaining amounts are not equal to or less than the predetermined amount are attached. Then, the user opens the cover of the printer 100 to exchange the cartridge. Note that the cover is opened/closed by the user at the time of cartridge exchange. Here, upon detecting that the cartridge is detached by the user, the light emitting control unit 71 turns off the light emitter corresponding to the position of the detached cartridge. Upon detecting that a new cartridge is attached by the user, the light emitting control unit 71 turns on the light emitter corresponding to the position where the cartridge is attached. Note that when the cover of the printer 100 is opened, the light emitting control unit 71 may perform light emitting control to indicate that a preparation for cartridge exchange is being made. Light emitting control at the time of decrease in the ink remaining amount may be executed when the cover of the printer 100 is opened.

As described above, in the printer 100 according to the first embodiment, since the light emitters 1501 to 1505 emit light in a different mode according to a situation, the user can more easily recognize the state of the printing apparatus. In particular, the printer 100 can cause a user who is not necessarily present near the printer to recognize the state of the printer. For example, even a user who inputs a printing instruction using a smartphone or the like and is not near the printer 100 can recognize, during printing, that the printhead 205 is being scanned, and can also recognize whether an error such as a paper jam has occurred, or whether ink has run out. If a plurality of printers are connected to a network, the user can recognize which printer is executing printing according to the printing instruction of the user.

Second Embodiment

The second embodiment is different from the first embodiment in that a light emitter emits light in a color according to the color information of a print image. A description of the same arrangement as in the first embodiment will be omitted, and points different from the first embodiment will mainly be described.

Figure 5:
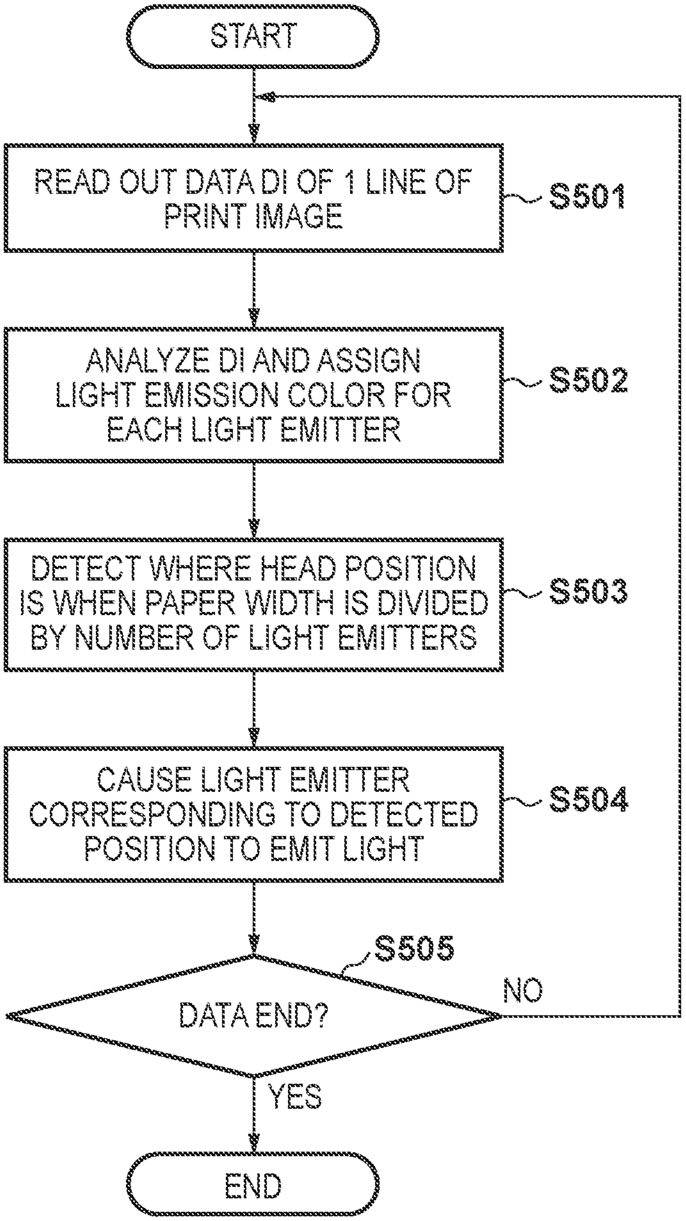
FIG. 5 is a flowchart showing an example of processing of light emitting control of a printer according to the second embodiment.

FIG. 5 is a flowchart showing light emitting control during printing in a printer 100 according to the second embodiment. For example, a CPU 201 loads a program stored in a ROM 202 into a RAM 203 and executes it to function as each functional unit shown in FIG. 7, thereby implementing this flowchart. This flowchart starts when, for example, a job is executed.

In step S501, an image analyzing unit 75 reads out data DI of one line of a print image. In step S502, the image analyzing unit 75 analyzes the readout data DI, and a light emitting control unit 71 decides the light emission color of each of the light emitters 1501 to 1505 based on the analysis result of the image analyzing unit 75. For example, for the light emitter 1501 located on the leftmost side when viewed from the front side of the printer 100, the analyzed data of one line is divided into five parts, and a light emission color according to the color of the region on the leftmost side is assigned. That is, each of the light emitters 1501 to 1505 emits light in a color according to the corresponding region.

Note that the color assigning method can appropriately be designed. As an example, the image analyzing unit 75 may acquire the RGB values of pixels in a region as color information from the readout data of the print image, and assign the average value as the light emission color. Additionally, for example, a plurality of light emission colors may be set in advance, and the image analyzing unit 75 may determine to which light emission color the color of each pixel in the region is close. The image analyzing unit 75 may assign a light emission color most determined to be close to the color of each pixel as the light emission color of the light emitter.

In step S503, a carriage driving control unit 73 detects, in positions obtained by dividing the paper width by the number of light emitters (in this embodiment, the paper width is divided into five parts), to which position the position of a printhead 205 corresponds. In step S504, the light emitting control unit 71 causes one of the light emitters 1501 to 1505 corresponding to the detected position to emit light in the light emission color assigned in step S502. That is, if it is detected in step S503 that the printhead 205 is located at the Nth position, the light emitting control unit causes the Nth light emitter 150N (N is 1 to 5) to emit light.

In step S505, the image analyzing unit 75 determines whether it is data end (readout of all lines of the print image data is completed). Upon determining that it is not data end (NO in step S505), the process returns to step S501. In the process returned to step S501, if the processing of the data of one line has been completed, the image analyzing unit 75 reads out the data of the next line, and executes the processing from step S502. On the other hand, upon determining in step S505 that it is data end (YES in step S505), the CPU 201 ends the procedure.

As described above, in the second embodiment, the light emission colors of the light emitters are controlled. This allows the user to recognize, from a remote position, which color image is being printed while recognizing, during printing, that the printhead 205 is being scanned. Additionally, for example, in a case in which a plurality of users share a printer, the user can recognize whether a printed product under printing is generated by a printing instruction of his/her own because the user can recognize, from a remote position, which color image is being printed.

Note that in the second embodiment, the light emission color is decided by analyzing the data of the print image on a line basis. However, the tone of entire image data may be analyzed, and the light emitters 1501 to 1505 may emit light in a color of the same system as the tone. In this case as well, the user can recognize, from a remote position, which color printed product is being printed. In addition, for example, the light emission colors of the light emitters may be decided in accordance with the contents of the print image including a print image type such as a photo, a text, or the like in addition to the tone of the print image.

OTHER EMBODIMENTS

In the above-described embodiments, light emitting control in a printing operation based on a print job has been described. However, the light emitting control unit 71 may perform light emitting control of the light emitters in a scan operation based on a scan job.

If the printer is powered on, the light emitting control unit 71 may perform light emitting control indicating power ON. If the printer is powered off, the light emitting control unit 71 may perform light emitting control indicating power OFF and then turn off the light emitters 1501 to 1504.

In the above-described embodiments, light emitters used for printing control are also used as light emitters used at the time of an error. However, another form is also possible. For example, a light emitter for error may be provided on the right side of the light emitter 1505 when the printer 100 is viewed from the front side. If an error has occurred, the light emitting control unit 71 may transit the state of the light emitter for error from a state when an error has not occurred to a state when an error has occurred.

In the above-described embodiments, the printer 100 whose printhead reciprocally moves in the main scanning direction has been described as an example. However, the processing according to the above-described embodiments may be executed in a printer of another type. For example, the processing according to the above-described embodiments may be applied to a printer that performs printing using a printhead having a size equal to or more than a printable paper width.

In the above-described embodiments, the description has been made using the printer 100 to which a cartridge can be attached. However, the processing according to the above-described embodiments may be applied to the printer 100 in which a fixed ink tank is refilled with ink.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068566, filed Mar. 29, 2019, which is hereby incorporated by reference herein in its entirety.

What is claimed is:

1. An inkjet printing apparatus performing printing with ink stored in a storing portion, comprising:

a light emitting control unit configured to control a mode of a light emitting unit that includes a light emitter and is provided on a housing of the inkjet printing apparatus; and a displaying panel configured to display information relating to the inkjet printing apparatus, wherein, in response to a fact that a state relating to a remaining amount of the ink stored in the storing portion has transited from a first state to a second state in which the remaining amount of the ink is less than that of the first state, the light emitting control unit causes the mode of the light emitting unit which is turned-on corresponding to the first state to transit to blinking corresponding to the second state in which the remaining amount of the ink is less than that of the first state.

2. The inkjet printing apparatus according to claim 1, further comprising a cassette which holds printing media on which printing is performed with the ink, wherein the light emitting unit and the displaying panel are provided on an exterior surface of the inkjet printing apparatus at which the cassette is provided.

3. The inkjet printing apparatus according to claim 2, wherein the printing media are paper media.

4. The inkjet printing apparatus according to claim 2, wherein the exterior surface is a surface facing a direction in which the cassette in the housing of the inkjet printing apparatus can be withdrawn.

5. The inkjet printing apparatus according to claim 2, wherein the exterior surface is a surface at a downstream side with respect to a direction in which the cassette in the housing of the inkjet printing apparatus can be withdrawn.

6. The inkjet printing apparatus according to claim 1, wherein the light emitting unit is different from the displaying panel.

7. The inkjet printing apparatus according to claim 1, wherein the displaying panel is a liquid crystal display panel.

8. The inkjet printing apparatus according to claim 1, wherein the displaying panel is a displaying panel for displaying at least a character.

9. The inkjet printing apparatus according to claim 1, wherein information relating to color of the ink which is stored in the storing portion and whose state has transited to the second state is displayed on the displaying panel.

10. The inkjet printing apparatus according to claim 1, wherein in a case in which an error occurs in the inkjet printing apparatus, a QR Code® corresponding to the error is displayed on the displaying panel, and the error is at least one of a paper jam, paper out, ink out, and a fault in the inkjet printing apparatus.

11. The printing apparatus according to claim 1, wherein the first state is a state in which printing can be performed by the inkjet printing apparatus.

12. The inkjet printing apparatus according to claim 1, wherein the first state is a state in which the remaining amount of the ink stored in the storing portion is greater than a predetermined amount, and the second state is a state in which the ink stored in the storing portion is equal to or less than the predetermined amount.

13. The inkjet printing apparatus according to claim 1, wherein the first state is a state in which the remaining amount of the ink stored in the storing portion is greater than a predetermined amount, and the second state is a state in which there is no ink in the storing portion.

14. The inkjet printing apparatus according to claim 1, wherein the light emitting unit includes less than five light emitters.

15. The inkjet printing apparatus according to claim 1, wherein the light emitting unit includes a plurality of light emitters.

16. The inkjet printing apparatus according to claim 1, wherein the storing portion is a cartridge.

17. The inkjet printing apparatus according to claim 1, wherein, in response to a fact that the state relating to the remaining amount of the ink stored in the storing portion has transited to the second state, the light emitting control unit causes the mode of the light emitting unit to transit to blinking corresponding to the second state by color of the ink whose state has transited to the second state.

18. The inkjet printing apparatus according to claim 1, wherein, in response to a fact that the state relating to the remaining amount of the ink stored in the storing portion has transited to the second state, the light emitting control unit causes a mode of only a light emitter corresponding to a position of the ink whose state has transited to the second state, among a plurality of light emitters included in the light emitting unit, to transit to blinking corresponding to the second state.

19. An inkjet printing apparatus performing printing with ink stored in a storing portion, comprising:

a light emitting control unit configured to control a mode of a light emitting unit that includes a light emitter and is provided on a housing of the inkjet printing apparatus; and a displaying panel configured to display information relating to the inkjet printing apparatus, wherein, in response to a fact that a state relating to a remaining amount of the ink stored in the storing portion has transited from a first state to a second state in which the remaining amount of the ink is less than that of the first state, the light emitting control unit causes the mode of the light emitting unit to transit from a first mode corresponding to the first state to a second mode corresponding to the second state, and the first mode is a mode in which a state of the light emitting unit continues to be in an on-state corresponding to the first state and the second mode is a mode in which an on-state and an off-state of the light emitting unit alternately repeat corresponding to the second state.

20. The inkjet printing apparatus according to claim 19, wherein, in response to a fact that the state of the remaining amount of the ink stored in the storing portion has transited to the second state, the light emitting control unit causes the mode of the light emitting unit to transit to the second mode in which turning-on and turning-off of the light emitting unit by color of the ink whose state has transited to the second state alternately repeat corresponding to the second state.

21. The inkjet printing apparatus according to claim 19, wherein, in response to a fact that the state of the remaining amount of the ink stored in the storing portion has transited to the second state, the light emitting control unit causes a mode of only a light emitter corresponding to a position of the ink whose state has transited to the second state, among a plurality of light emitters included in the light emitting unit, to transit to the second mode in which turning-on and turning-off of the light emitting unit repeat corresponding to the second state.

22. An inkjet printing apparatus, comprising:

a printing unit configured to perform printing by ink stored in an ink tank provided in the inkjet printing apparatus, wherein the ink is refilled into the ink tank and the ink tank is not exchanged; and a light emitting control unit configured to control a mode of a light emitting unit that includes a light emitter and is provided on a housing of the inkjet printing apparatus, wherein, in response to a fact that a state relating to a remaining amount of the ink stored in the ink tank has transited from a first state to a second state in which the remaining amount of the ink is less than that of the first state, the light emitting control unit causes the mode of the light emitting unit to transit from turned-on corresponding to the first state to blinking corresponding to the second state.

23. The inkjet printing apparatus according to claim 22, further comprising a displaying panel configured to display information relating to the inkjet printing apparatus.

24. The inkjet printing apparatus according to claim 23, further comprising a cassette which holds printing media on which printing is performed with the ink, wherein the light emitting unit and the displaying panel are provided on an exterior surface of the inkjet printing apparatus at which the cassette is provided.

25. The inkjet printing apparatus according to claim 24, wherein the printing media are paper media.

26. The inkjet printing apparatus according to claim 24, wherein the exterior surface is a surface facing a direction in which the cassette in the housing of the inkjet printing apparatus can be withdrawn.

27. The inkjet printing apparatus according to claim 24, wherein the exterior surface is a surface at a downstream side with respect to a direction in which the cassette in the housing of the inkjet printing apparatus can be withdrawn.

28. The inkjet printing apparatus according to claim 23, wherein the light emitting unit is different from the displaying panel.

29. The inkjet printing apparatus according to claim 23, wherein the displaying panel is a liquid crystal display panel.

30. The inkjet printing apparatus according to claim 23, wherein the displaying panel is a displaying panel for displaying at least a character.

31. The inkjet printing apparatus according to claim 23, wherein information relating to color of the ink which is stored in the ink tank and whose state has transited to the second state is displayed in the displaying panel.

32. The inkjet printing apparatus according to claim 23, wherein, in a case in which an error occurs in the inkjet printing apparatus, a QR® code corresponding to the error is displayed in the displaying panel, and the error is at least one of a paper jam, paper out, ink out, and a fault in the inkjet printing apparatus.

33. The inkjet printing apparatus according to claim 22, wherein the first state is a state in which printing can be performed by the inkjet printing apparatus.

34. The inkjet printing apparatus according to claim 22, wherein the first state is a state in which the remaining amount of the ink stored in the ink tank is greater than a predetermined amount, and the second state is a state in which the remaining amount of the ink stored in the ink tank is equal to or less than the predetermined amount.

35. The inkjet printing apparatus according to claim 22, wherein the first state is a state in which the remaining amount of the ink stored in the ink tank is greater than a predetermined amount, and the second state is a state in which there is no ink in the ink tank.

36. The inkjet printing apparatus according to claim 22, wherein the light emitting unit includes a plurality of light emitters.

37. The inkjet printing apparatus according to claim 22, wherein light emitting unit includes less than five light emitters.

38. The inkjet printing apparatus according to claim 22, wherein, in response to a fact that the state relating to the remaining amount of the ink stored in the ink tank has transited to the second state, the light emitting control unit causes the mode of the light emitting unit to blink, corresponding to the second state, by color of the ink whose state has transited to the second state.

39. The inkjet printing apparatus according to claim 22, wherein, in response to a fact that the state relating to the remaining amount of the ink stored in the ink tank has transited to the second state, the light emitting control unit causes only a light emitter corresponding to a position of the ink whose state has transited to the second state, among a plurality of light emitters included in the light emitting unit, to blink corresponding to the second state.

40. An inkjet printing apparatus, comprising:

a printing unit configured to perform printing by ink stored in an ink tank provided in the inkjet printing apparatus, wherein the ink is refilled into the ink tank and the ink tank is not exchanged; and a light emitting control unit configured to control a mode of a light emitting unit that includes a light emitter and is provided on a housing of the inkjet printing apparatus, wherein, in response to a fact that a state relating to a remaining amount of the ink stored in the ink tank has transited from a first state to a second state in which the remaining amount of the ink is less than that of the first state, the light emitting control unit causes the mode of the light emitting unit to transit from a first mode corresponding to the first state to a second mode corresponding to the second state, and the first mode is a mode in which a state of the light emitting unit continues to be in an on-state corresponding to the first state and the second mode is a mode in which an on-state and an off-state of the light emitting unit alternately repeat corresponding to the second state.

41. The inkjet printing apparatus according to claim 40, wherein, in response to a fact that the state of the remaining amount of the ink stored in the ink tank has transited to the second state, the light emitting control unit causes the mode of the light emitting unit to transit to the second mode in which turning-on and turning-off of the light emitting unit by color of the ink whose state has transited to the second state alternately repeat corresponding to the second state.

42. The inkjet printing apparatus according to claim 40, wherein, in response to a fact that the state of the remaining amount of the ink stored in the ink tank has transited to the second state, the light emitting control unit causes a mode of only a light emitter corresponding to a position of the ink whose state has transited to the second state, among a plurality of light emitters included in the light emitting unit, to transit to the second mode in which turning-on and turning-off of the light emitting unit whose state has transited to the second state alternately repeat corresponding to the second state.

* * * * *